M. Raezer.
Horse Hay Rake.
No. 3960.
Reissued May 3. 1870
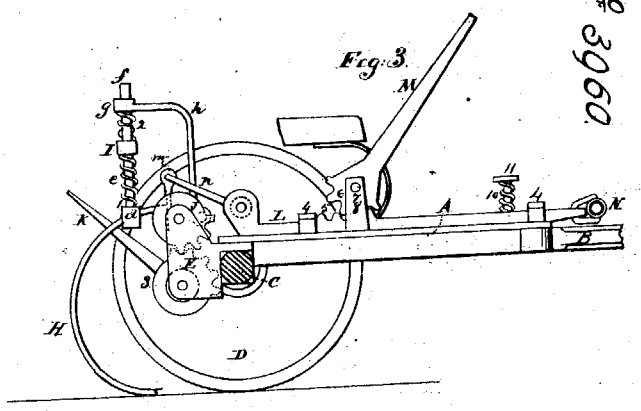
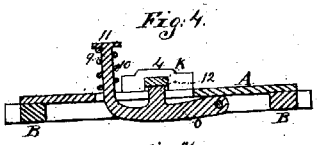
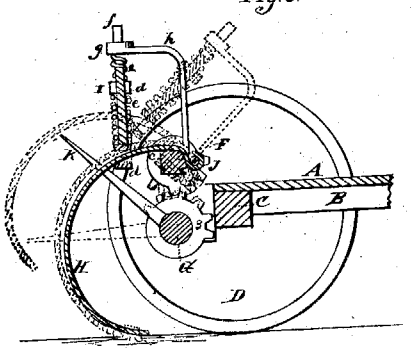
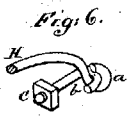
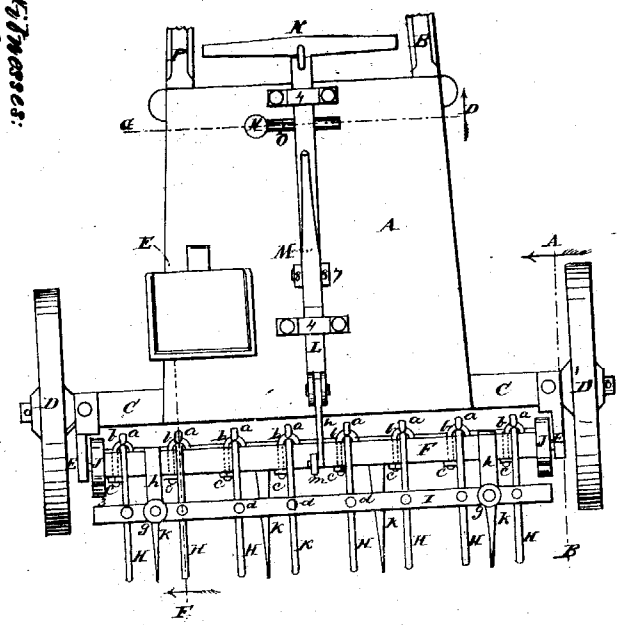
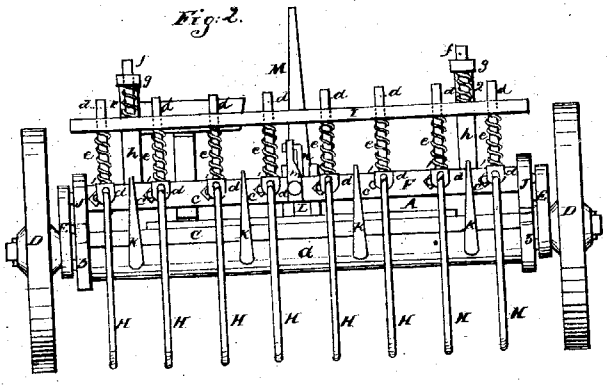
Witnesses:
Thos. H. Dodge
D. L. Miller.
Inventor.
Alfirus Brown

United States Patent Office.

ALZIRUS BROWN, OF WORCESTER, MASSACHUSETTS, ASSIGNEE, BY MESNE ASSIGNMENTS, OF MATHIAS RAEZER.

*Letters Patent No.* 26,294, *dated November* 29, 1859; *reissue No.* 3,960, *dated May* 3, 1870.

IMPROVEMENT IN HORSE HAY-RAKES.

The Schedule referred to in these Letters Patent and making part of the same

*To all whom it may concern:*

Be it known that MATHIAS RAEZER, of Reading, in the county of Berks and State of Pennsylvania, did invent certain new and useful Improvements in Horse Hay-Rakes, of which the following is a full, clear, and exact description, reference being had to the accompanying drawings forming a part of this specification, in which—

Figure 1 represents a plan or top view of his said improved horse hay-rake, the shafts being shown broken off;

Figure 2 represents a rear view;

Figure 3 represents a section on line A B, fig. 1;

Figure 4 represents a section on line C D, fig. 1;

Figure 5 represents in dark lines a section on line E F, fig. 1, and in blue and red lines some of the parts in different positions; and Figure 6 represents a perspective view of one of the eye-bolts, and the upper part of one of the teeth, as will be hereafter explained.

To enable those skilled in the art to which the said RAEZER'S invention belongs to make and use the same, I will describe it more in detail.

The nature of the invention consists—

First, in the combination, in a two-wheeled horse hay-rake, with a series of curved wire teeth, hinged or connected at their upper forward ends by yielding joints, of a series of independent self-adjusting guides, upon which are arranged yielding springs, substantially as hereafter set forth.

Second, in the arrangement, in a two-wheeled horse hay-rake, of a series of curved gathering-teeth and separate detachable eye-bolts, *b*, with a gained or grooved rake-head, whereby either one of the teeth can be easily disconnected or connected with the head by partially unscrewing the nut of the eye-bolt, substantially as hereafter described.

Third, in the arrangement, with the rake-head and slide-bar, located upon the platform, and provided with cog-teeth, of a hand-lever provided with cog-teeth, hinged connecting-piece, foot-lever provided with projections, and foot-pad and spring, all as hereafter set forth.

Fourth, in the combination, with the rake-head and rake-teeth, of independent guides, guide-springs, and cross-spring bar, with depressing-springs, substantially as hereafter described.

In the drawings—

A is the platform, which is secured to the rear ends of the shafts B B, fastened to the axle C, which is supported by the wheels D D.

Fastened to each end of axle C, and projecting back and up, are two bearing or hanger-pieces, E E, in the upper ends of which the journals of the rake-head F are supported, while in their lower ends the journals of the bar G, to which the clearer-fingers are attached, are supported.

The front side of the rake-head is vertically grooved or gained out, to receive the upper ends of the teeth H, and prevent them from having too much lateral play.

The teeth H are simply curved, with eyes *a* at their upper ends, to receive the hooked ends of the eye-bolts *b*, the shanks of which pass through the head F, and are secured in place by nuts *c*, as fully indicated in the drawings.

By this mode of connecting the teeth with the head, they are free to rise, in consequence of their hinged or jointed connections with the head, while they can be detached from the head by simply removing the eye-bolts, so as to slip their eyes off of the hooked ends of the same.

It will be observed that the gains or grooves in the head F, being back of the point where the teeth are secured to the head, will prevent the teeth from having too much lateral play when their lower ends are raised or forced back, as shown in blue lines, by coming in contact with obstructions.

As the gains or grooves are moved with the teeth when they are raised to discharge the hay, the teeth are not liable to derangement, or to be thrown out of their respective grooves or gains, either during the operation of raking or discharging the hay.

To give the teeth elasticity, and, at the same time, to hold and sustain them against back strain during the operation of raking, they are passed through oblong holes or slots in the lower ends of guides *d*, the upper ends of guides *d* being provided with coiled or spiral-wire springs *e*, the lower ends of the springs resting upon the shoulders 1 of the guides *d*, while the upper ends of the springs press up against the under side of the cross-spring bar I, through which the upper ends of guides *d* pass, and are free to slide or move therein.

Bar I is arranged parallel to the rake-head and is provided at each end with a pin or stud, *j*, said studs being fitted to work up and down freely in holes in the ends *g* of the bent arms *h*, which are secured to the rake-head, so as to turn with it.

Upon the studs *f f* are placed spiral or coiled-wire springs 2, whereby the elasticity of the teeth is rendered still greater.

Upon the ends of the rake-head are secured segment-gears J J, the teeth of which mesh into similar teeth or cogs on segment-gears 3 3 on the ends of the rock-shaft or bar G, to which the clearer-fingers K are attached.

To the top of the rake-head is fastened an arm, *m*, which is coupled with the rear end of the sliding draft-bar L by means of the connection *n*.

The slide-bar L is fitted to work in the guides 4 4 on the platform A, and is provided on its rear upper side with cog-teeth 5, to mesh with the teeth 6 on the lower end of lever M, pivoted, at 7, between standards 8.

To the front of slide-bar L is attached the single-tree N, to which the horse is attached when the rake is to be used.

Underneath the platform is hinged the foot and automatic locking-lever O. One end, 9, of said lever projects up through the platform, and is provided with a spring, 10, which presses up against the foot-pad 11 on the extreme upper end of lever O, while a locking-arm or projection, 12, on the center of said lever, passes up through the platform, and enters a notch in the lower side of the slide-piece L.

The object of the locking-arm 12 is to hold the teeth and head from being turned forward by the resistance of the hay while being gathered, or from being prematurely operated by the horse.

By arranging the driver's seat upon the left-hand side of the rake, and the mechanism for elevating the rake-teeth near the middle or center, several advantages are obtained, among which may be mentioned the following:

First. The position of the driver is such that he can see obstructions which may be in the path, or forward of the horse, and thus be able to avoid them by turning to the right or left before they are struck by the rake-teeth.

Second. By the arrangement of the teeth and head-operating mechanism near the center of the rake, there is less straining of the parts, and less liability of springing the head. Besides, the hand head-operating lever, being at the right of the driver, is not liable to interfere with the driver's limbs.

In fig. 5, the relative position of the rake-head, teeth, and clearing-fingers are shown in red lines as they appear when the raked hay is being discharged, while the elasticity or yielding capacity of the teeth in passing an obstruction is indicated in blue lines, same figure.

The locking-lever O also holds the teeth from dropping or falling too low, or burying themselves in the ground while the rake is in operation, thus preventing the head from turning back, as well as from turning forward, while gathering the hay.

Having thus described the improvements of the said MATHIAS RAEZER in horse hay-rakes,

What I claim as the invention of said MATHIAS RAEZER, and desire to have secured by Letters Patent, is—

1. The combination, in a two-wheeled horse hay-rake, with a series of curved-wire teeth, hinged or connected at their forward upper ends by yielding joints, of a series of independent self-adjusting guides, upon which are arranged yielding springs, substantially as set forth.

2. The arrangement, in a two-wheeled horse hay-rake, of a series of curved gathering-teeth, H, and separate detachable eye-bolts *b*, with a gained or grooved rake-head, F, whereby either one of the teeth can be easily disconnected or connected with the head by partially unscrewing the nut of the eye-bolt, substantially as described.

3. The arrangement, with the rake-head F and slide-bar L, located upon the platform A, and provided with cog-teeth, of a hand-lever, M, provided with cog-teeth, hinged connecting-piece *n*, foot-lever O, provided with projections 9 and 12, foot-pad 11, and spring 10, said parts being arranged, in relation to each other, substantially as described.

4. The combination, with the rake-head F, teeth H, guides *d*, and springs *e*, of cross-spring bar I, with its depressing-springs, substantially as described.

ALZIRUS BROWN.

Witnesses:
THOS. H. DODGE,
D. L. MILLER.